(12) United States Patent
Sugita et al.

(10) Patent No.: US 7,056,614 B2
(45) Date of Patent: *Jun. 6, 2006

(54) MEMBRANE ELECTRODE ASSEMBLY AND FUEL CELL UNIT

(75) Inventors: Narutoshi Sugita, Utsunomiya (JP); Masaaki Nanaumi, Utsunomiya (JP); Tadashi Nishiyama, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 140 days.

This patent is subject to a terminal disclaimer.

(21) Appl. No.: 10/191,007

(22) Filed: Jul. 8, 2002

(65) Prior Publication Data

US 2003/0027032 A1    Feb. 6, 2003

(30) Foreign Application Priority Data

Jul. 10, 2001    (JP)    ............................ P2001-209831

(51) Int. Cl.
*H01M 2/08*    (2006.01)
(52) U.S. Cl. .......................................... 429/35; 429/36
(58) Field of Classification Search .................. 429/30, 429/34–37
See application file for complete search history.

(56) References Cited

U.S. PATENT DOCUMENTS

| | | | | |
|---|---|---|---|---|
| 5,173,373 A | * | 12/1992 | Ohsuga | ........................ 429/35 |
| 5,264,299 A | * | 11/1993 | Krasij et al. | ................... 429/30 |
| 5,464,700 A | * | 11/1995 | Steck et al. | .................... 429/30 |
| 6,057,054 A | * | 5/2000 | Barton et al. | .................. 429/42 |
| 6,261,711 B1 | * | 7/2001 | Matlock et al. | ............... 429/34 |
| 2003/0215690 A1 | * | 11/2003 | Wald et al. | .................... 429/35 |

FOREIGN PATENT DOCUMENTS

| | | |
|---|---|---|
| EP | 1152477 A2 | 11/2001 |
| JP | 06-96783 | 4/1994 |

* cited by examiner

*Primary Examiner*—Tracy Dove
(74) *Attorney, Agent, or Firm*—Lahive & Cockfield, LLP; Anthony A. Laurentano, Esq.

(57) ABSTRACT

The present invention aims to provide a membrane electrode assembly that can increase durability by increasing the strength of an extending part of a solid polymer electrolyte membrane, and can also reduce cost by minimizing the volume of the solid polymer electrolyte membrane used.

In the present invention, an anode electrode is provided on one side of a solid polymer electrolyte membrane, and a cathode electrode is provided on the other side of the solid polymer electrolyte membrane. The solid polymer electrolyte membrane is formed such that its outer peripheral portion extends the anode electrode and the cathode electrode on both sides thereof. A frame-shaped first sealing member is closely contacted with the outer peripheral edge face of the anode electrode or the cathode electrode. The frame-shaped first sealing member coats and supports one face of the extending part of the solid polymer electrolyte membrane.

6 Claims, 5 Drawing Sheets

MEMBRANE ELECTRODE ASSEMBLY AND FUEL CELL UNIT

BACKGROUND OF THE INVENTION

1. Field of the Invention

This invention relates to a membrane electrode assembly and a fuel cell unit. In particular, the invention relates to a membrane electrode assembly and a fuel cell unit that are formed such that an outer peripheral portion of a solid polymer electrolyte membrane extends from an anode electrode and a cathode electrode on both sides thereof.

2. Description of the Related Art

A fuel cell unit, being a basic unit of a fuel cell, is constructed such that a membrane electrode assembly is sandwiched on both sides between a separator provided with fuel gas flow passages and a separator provided with oxidant gas flow passages. The membrane electrode assembly is constructed such that a pair of electrodes is installed, on each side of a solid polymer electrolyte membrane, and each of the pair of electrodes is provided with an electrode catalytic layer and a gas diffusion layer. Accordingly, in the electrode (anode electrode) to which fuel gas (for example, hydrogen) is supplied from the fuel gas flow passages, hydrogen is ionized, and is transferred to the other electrode (cathode electrode) via the solid polymer electrolyte membrane. Electrons generated during this time are extracted to an external circuit, and used as direct current electric energy. In the cathode electrode, to which oxidant gas (for example, air containing oxygen) is supplied, hydrogen ions, electrons and oxygen react, and water is generated.

Such membrane electrode assemblies are disclosed in Japanese Unexamined Patent Application, First Publication No. 5-234606, Japanese Unexamined Patent Application, First Publication No. 6-96783, Japanese Unexamined Patent Application, First Publication No. 8-148169 and U.S. patent application Ser. No. 5,464,700.

Typically, the outer peripheral portion of a solid polymer electrolyte membrane extends from the electrodes on both sides in order to function as a seal for preventing the mixing of fuel gas on the anode electrode side and oxidant gas on the cathode electrode side. However, since the solid polymer electrolyte membrane itself is very thin, the extending portion from the electrodes can be easily damaged by the pressure difference (pressure difference between electrodes) between the fuel gas and the oxidant gas mentioned above. In order to prevent such damage, consideration has been given to reinforcing the portion that extends in the membrane electrode assembly (extending part).

Japanese Unexamined Patent Application, First Publication No. 5-234606 discloses a membrane electrode assembly which is provided with a stiffening member in a frame shape contacting an extending part of a solid polymer electrolyte membrane. However, since there is a gap between the stiffening member and electrode, there is a possibility of a difference in moisture content between the gap and the other areas caused by generated water being deposited in this gap, or the like. If the moisture content differs, it causes a difference in extension and contraction force, and stress occurs in the gap. Therefore, there is a problem in that the solid polymer electrolyte membrane may be damaged. Furthermore, when forming a fuel cell unit using a membrane electrode assembly, it is necessary to provide a sealing structure in order to prevent fuel gas or the like from leaking outside. However, Japanese Unexamined Patent Application, First Publication No. 5-234606 does not disclose a sealing structure in the membrane electrode assembly, so there is a problem in that a sealing structure is complicated due to the provision of the stiffening member.

Japanese Unexamined Patent Application, First Publication No. 6-96783 discloses a membrane electrode assembly wherein frame-shaped gaskets are provided on both sides of a solid polymer electrolyte membrane. However, in this construction, there are problems in that by providing gaskets on both sides of the membrane, the number of parts increases, the routing becomes complicated, and cost becomes high.

In the membrane electrode assembly disclosed in Japanese Unexamined Patent Application, First Publication No. 8-148169, the solid polymer electrolyte membrane extends to the outer periphery. Therefore, proportionately more, expensive, solid polymer electrolyte membrane material is required, so there is a problem in that it is expensive.

The membrane electrode assembly disclosed in U.S. Pat. No. 5,464,700 requires that a seal and electrode overlap. Therefore, when the membrane electrode assembly is laminated and pressurized, the load is concentrated on the overlapping part, while the other areas do not have sufficient pressure, so there is a problem of possible instability.

SUMMARY OF THE INVENTION

Therefore, this invention provides a membrane electrode assembly that can prevent damage of the extending part of a solid polymer electrolyte membrane, and also reduce cost by minimizing the volume of the solid polymer electrolyte membrane used.

Furthermore, this invention provides a fuel cell unit that can improve the sealing ability of a membrane electrode assembly and separators.

To solve the above problems, the present invention is a membrane electrode assembly (for example, a membrane electrode assembly 2 in the embodiments) provided with an anode electrode (for example, an anode electrode 24 in the embodiments) on one side of a solid polymer electrolyte membrane (for example, a solid polymer electrolyte membrane 22 in the embodiments), and provided with a cathode electrode (for example, a cathode electrode 26 in the embodiments) on the other side of the solid polymer electrolyte membrane, wherein an outer peripheral portion of the solid polymer electrolyte membrane is formed extending from the anode electrode and the cathode electrode on both sides, a first sealing member (for example, a frame-shaped first sealing member 27 in the embodiments) whose planar dimension are greater than those of the solid polymer electrolyte membrane is provided in close contact with an outer peripheral edge face of only one of either of the anode electrode and the cathode electrode, and one face (for example, a face 23*a* in the embodiments) of the extending part (for example, an extending part 23 in the embodiments) of the solid polymer electrolyte membrane, is coated and supported by the frame-shaped first sealing member.

The present invention is that the frame-shaped first sealing member coats an edge face (for example, an edge face 23*b* in the embodiments) of the solid polymer electrolyte membrane.

The present invention is a fuel cell unit (for example, a fuel cell unit 10 in the embodiments) with a membrane electrode assembly provided with an anode electrode on one side of a solid polymer electrolyte membrane, and provided with a cathode electrode on the other side of the solid polymer electrolyte membrane, sandwiched between a pair of separators (for example, separators 12 and 14 in the embodiments), wherein an outer peripheral portion of the solid polymer electrolyte membrane is formed extending the anode electrode and the cathode electrode on both sides, a first sealing member (for example, a frame-shaped first sealing member 27 in the embodiments) whose planar dimensions are greater than those of the solid polymer electrolyte membrane, is provided in close contact with an outer peripheral edge face of only one of either of the anode electrode and the cathode electrode (for example, an anode electrode 24), and one face of the extending part of the solid polymer electrolyte membrane is coated and supported by the frame-shaped first sealing member, and a second sealing member (for example, a second sealing member 30 in the embodiments) is provided between the frame-shaped first sealing member or the solid polymer electrolyte membrane and a separator (for example, a separator 14 in the embodiments) contacting the other electrode (for example, a cathode electrode 26 in the embodiments).

The present invention is that the frame-shaped first sealing member coats an edge face (for example, an edge face 23b in the embodiments) of the solid polymer electrolyte membrane.

The present invention is that a third sealing member (for example, a third sealing member 32 in the embodiments) is provided outside the first sealing member and the second sealing member and between the pair of separators.

BRIEF DESCRIPTION OF THE DRAWINGS

FIG. 1 is a sectional view of a fuel cell unit using a membrane electrode assembly of a first embodiment of this invention.

FIG. 2 is a sectional view of a fuel cell unit using a membrane electrode assembly of a second embodiment of this invention.

FIG. 3 is a sectional view of a fuel cell unit using a membrane electrode assembly of a third embodiment of this invention.

FIG. 4A is a sectional view of a mold used for manufacturing a first frame-shaped sealing member of the embodiments of this invention, and FIG. 4B is a diagram of a manufacturing process for a first frame-shaped sealing member.

FIG. 5A and FIG. 5B show diagrams of a manufacturing process for a first sealing member of the embodiments of this invention.

FIG. 6A and FIG. 6B show sectional views of examples of modified anode electrodes and first frame-shaped sealing members of the embodiments of this invention.

FIG. 7 is a plan view showing an anode electrode and the first frame-shaped sealing member of the embodiments of this invention.

[Description of Symbols]

| | |
|---|---|
| 10 | Fuel cell unit |
| 12 | Separator |
| 14 | Separator |
| 20 | Membrane Electrode Assembly |
| 22 | Solid Polymer Electrolyte Membrane |
| 24 | Anode Electrode |
| 26 | Cathode Electrode |
| 28 | Frame-Shaped First Sealing Member (Frame-Shaped Member) |
| 30 | Second Sealing Member |
| 32 | Third Sealing Member |

DETAILED DESCRIPTION OF THE PREFERRED EMBODIMENTS

Hereunder is a description of membrane electrode assemblies of embodiments of this invention, with reference to the drawings.

Figure 1:
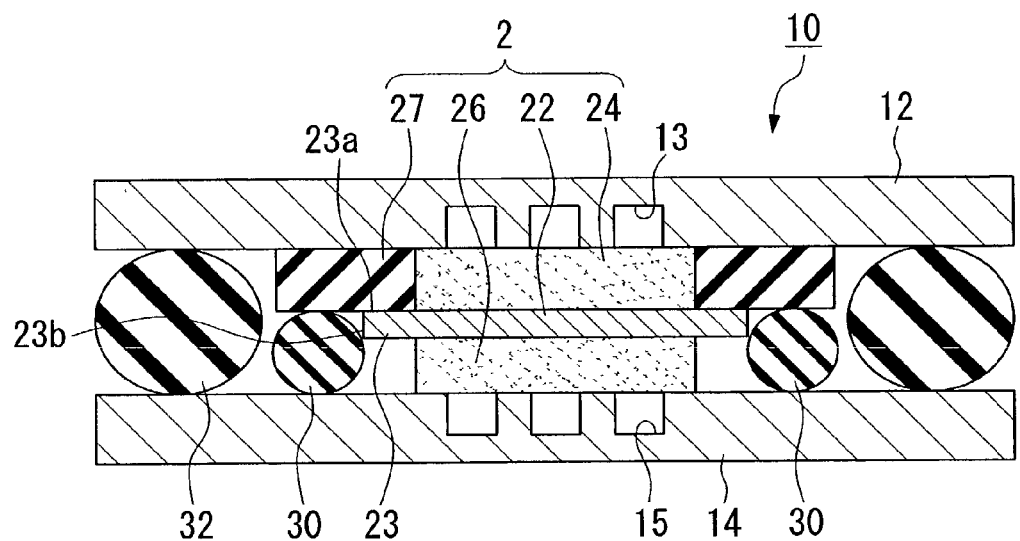
[FIG. 1]

FIG. 1 is a sectional view of a fuel cell unit using a membrane electrode assembly of a first embodiment of this invention. This fuel cell unit 10 is provided with a membrane electrode assembly 2 sandwiched between first and second separators 12 and 14, and a plurality of these laminated together forms a vehicle fuel cell stack. In the first and second separators 12 and 14, flow passages 13 and 15 are formed respectively for distributing reactant gas. In the present embodiment, fuel gas (hydrogen) is distributed through the flow passage 13 in the first separator 12, and oxidant gas (air) through the flow passage 15 in the second separator 14.

The membrane electrode assembly 2 has a solid polymer electrolyte membrane 22, and this solid polymer electrolyte membrane 22 is sandwiched between an anode electrode 24 and a cathode electrode 26. In the anode electrode 24 and the cathode electrode 26, for example, a first gas diffusion layer and a second gas diffusion layer are provided, composed of porous carbon cloth or porous carbon paper, and electrode catalytic layers with platinum as their main constituent are provided on the opposite faces of these gas diffusion layers from the solid polymer electrolyte membrane 22. In the present embodiment, a perfluorosulfonic acid polymer is used as the material of the solid polymer electrolyte membrane 22. Here, for the material of the solid polymer electrolyte membrane 22, it is also possible to use a material in which hydrocarbon resin is the main constituent.

The outer peripheral portion of the solid polymer electrolyte membrane 22 extends the anode electrode 24 and the cathode electrode 26 a little (for example, 1 to 2 mm), and a frame-shaped first sealing member (frame-shaped member) 27 whose planar dimensions are greater than those of the solid polymer electrolyte membrane 22 is integrated with the outer edges of this extending portion (extending part) 23. The frame-shaped member 28 is closely contacted with and integrated with the outer peripheral edge face of only the anode electrode 24 of the pair of electrodes 24 and 26. Furthermore, the frame-shaped member 27 is closely contacted with one surface 23a of the extending part 23 of the solid polymer electrolyte membrane 22, and integrated with the solid polymer electrolyte membrane 22, and thus it supports the solid polymer electrolyte membrane 22. That is, the face 23a of the extending part 23 of the solid polymer electrolyte membrane 22 is coated and supported by the frame-shaped member 27. By so doing, it is possible to increase the strength of the extending part 23 of the solid polymer electrolyte membrane 22 in the thickness direction, using the frame-shaped member 27, and its durability is improved. As a result, even if the pressures of reactant gas supplied from the anode electrode 24 side and from the cathode electrode 26 side of the solid polymer electrolyte membrane 22 are different, where conventionally there is a possibility of damage, it is possible to maintain a stable state.

Furthermore, since the frame-shaped member 27 and the face 23a of the extending part 23 are laminated (overlapped), it is possible to increase the force joining the frame-shaped member 27 and the solid polymer electrolyte membrane 22. In particular, in the case where the electrode (the anode electrode 24 in the present embodiment) that is closely contacted with the frame-shaped member 27 is thin, it is possible to maintain a high adhesive force, and hence this can be ideally used in a membrane electrode assembly 2 in which the anode electrode 24 or the cathode electrode 26 is thin.

Moreover, since the frame-shaped member 27 and the outer peripheral face of the anode electrode 24 are closely contacted together, it is possible to protect the whole face 23a (the face on the anode electrode 24 side in the present embodiment) of the solid polymer electrolyte membrane 22. On the other hand, since the extending part 23 on the cathode electrode 26 side is open, it is possible to prevent stress occurring due to local changes in the moisture content of the extending part 23.

In the present embodiment, by closely contacting the surface of the frame-shaped member 27 and a second sealing member 30, the membrane electrode assembly 2 is sealed against the outside. As described above, the frame-shaped member 27 coats the edge face of the anode electrode 24 and the face 23a of the solid polymer electrolyte membrane 22. As a result, by closely contacting the frame-shaped member 27 and the second sealing member 30 between the separators 12 and 14, the anode electrode 24, the solid polymer electrolyte membrane 22 and the cathode electrode 26 are sealed against the outside, so that it is possible to prevent the reactant gases from leaking outside from the reaction plane. Accordingly, sealing against the outside can be achieved by using a single sealing structure. Furthermore, since the first sealing member 27 is frame-shaped, and the contact face with the second sealing member 30 is flat, the degree of freedom of the location of the second sealing member 30 is increased compared with the case where the first sealing member 27 is circle- or round-shaped. As a result, the manufacturing process of the fuel cell unit 10 is simplified. Moreover, since the second sealing member 30 does not need to be in contact with the extending part 23 of the solid polymer electrolyte membrane 22, and may be in contact with the frame-shaped member 27, it is possible to reduce the size of the solid polymer electrolyte membrane 22 proportionately. Hence it is possible to achieve low cost by reducing the amount of expensive materials used for the solid polymer electrolyte membrane 22 proportionately. Furthermore, since the profile of the second sealing member 30 is circular, it is compressed (transformed to an elliptical profile) in the thickness direction when forming the fuel cell unit 10, and the close contact with the frame-shaped member 27 is increased, so it is possible to exhibit a strong sealing ability.

Moreover, in the present embodiment, a third sealing member 32 is provided outside the frame-shaped member 27 and the second sealing member 30, and between the separators 12 and 14, to form the fuel cell unit 10. By double sealing the fuel cell unit 10 in this manner, it is possible to seal the membrane electrode assembly 10 more reliably against the outside. Furthermore, since the second sealing member 30 and the third sealing member 32 are independent members, and installed in different locations, the degree of freedom of selecting the materials and locations is increased, so the manufacture of fuel cell units 10 is simplified. Moreover, it is possible to produce a variety of fuel cell units 10. Here, in the present embodiment, a fuel cell unit 10 with a double sealing structure is described. However, it is not limited to this, and there may be three or more sealing structures. Furthermore, it is preferable for the second sealing member 30 to be installed in a location facing the frame-shaped member 27, by which means sealing of the solid polymer electrolyte membrane 22 against the outside is increased. However, it may be installed in a location facing the solid polymer electrolyte membrane 27.

Figure 2:
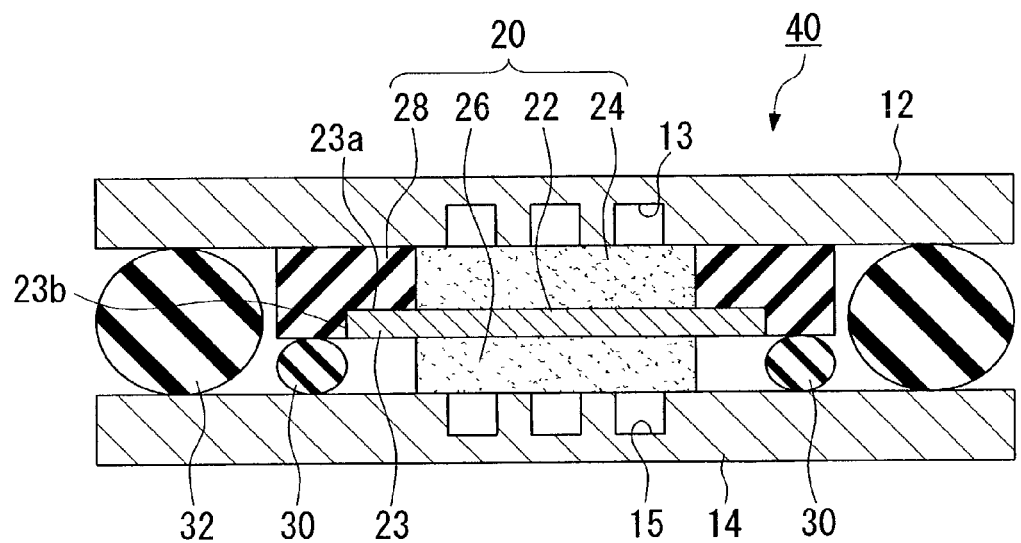
[FIG. 2]

FIG. 2 is a sectional view of a fuel cell unit 40 using a membrane electrode assembly of a second embodiment of this invention. Here, in the following, the same numbers are used for the same members as in the first embodiment, and description thereof is omitted.

In a membrane electrode assembly 20 of the present embodiment, a frame-shaped first sealing member (frame-shaped member) 28 is closely contacted with one face 23a and an edge face 23b of an extending part 23 of a solid polymer electrolyte membrane 22, and also integrated with the solid polymer electrolyte membrane 22, by which means it supports the solid polymer electrolyte membrane 22. That is, the face 23a and the edge face 23b of the extending part 23 of the solid polymer electrolyte membrane 22 are coated and supported by the frame-shaped member 28. By so doing, it is possible to increase the strength of the extending part 23 of the solid polymer electrolyte membrane 22 in the thickness direction, and its strength in the edge face direction, using the frame-shaped member 28, and its durability is improved. As a result, even if the pressures of reactant gas supplied from the anode electrode 24 side and from the cathode electrode 26 side of the solid polymer electrolyte membrane 22 are different, where conventionally there is a possibility of damage, it is possible to maintain a more stable state.

Figure 3:
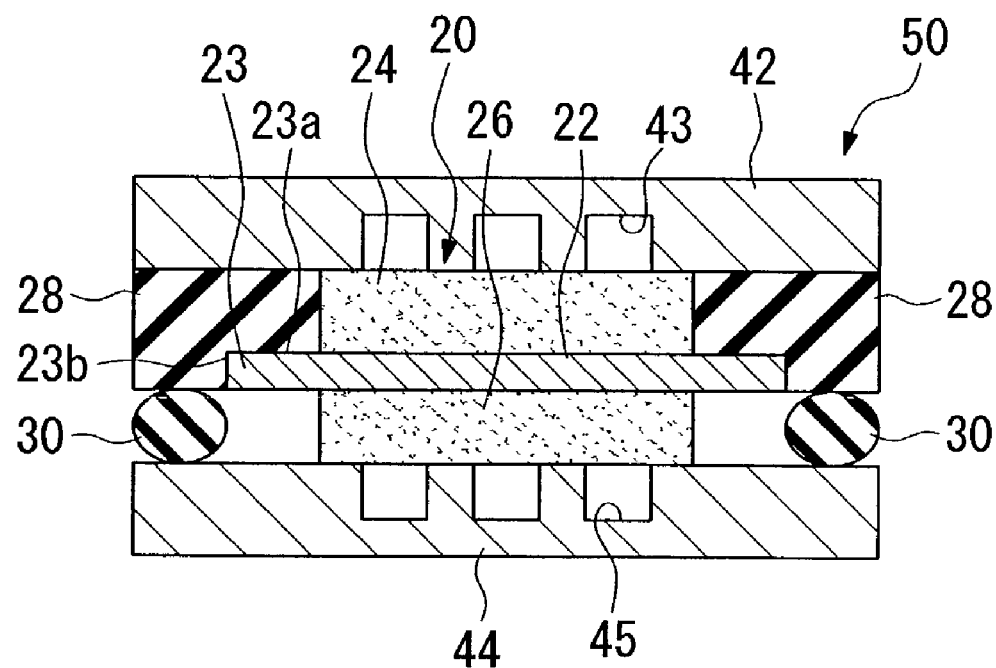
[FIG. 3]

FIG. 3 is a sectional view of a fuel cell unit 50 of a third embodiment of this invention. In the present embodiment, the fuel cell unit 50 is sealed by a frame-shaped member 28 and a second sealing member 30, and separators 42 and 44 are formed to be the same size with the membrane electrode assembly 20. In the separators 42 and 44, similarly to the first embodiment, flow passages 43 and 45 are formed respectively for distributing reactant gas, and fuel gas (hydrogen) is distributed through the flow passage 43, and oxidant gas (air) through the flow passage 45. By so doing, it is possible to reduce the volume of the whole fuel cell unit 50 for compactness. Furthermore, in the case where the size of the fuel cell unit 50 is made to be the same as the fuel cell units 10 and 40, it is possible to increase the size of the membrane electrode assembly 20 proportionately, and hence the electric power generation output of the fuel cell unit 50 can be increased.

A process for molding the frame-shaped member 28 onto the outer peripheral portion of an electrode (for example, an anode electrode 24) will be described using FIG. 4A, FIG. 4B, FIG. 5A, and FIG. 5B.

Figure 4A:
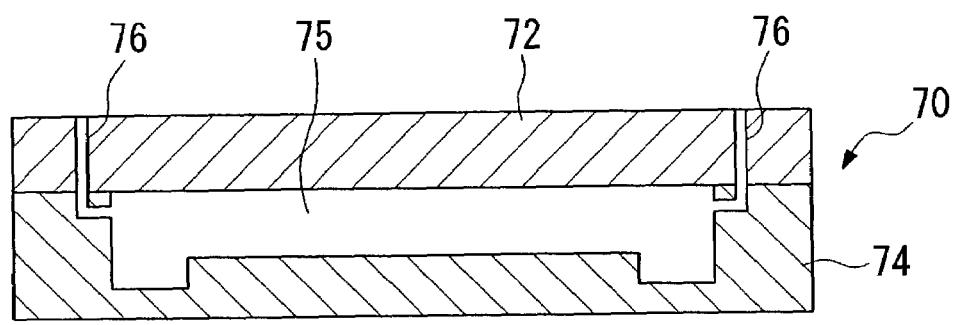
[FIG. 4A and FIG. 4B]

FIG. 4A is a sectional view of a metal mold 70 used for molding the frame-shaped member 28. The metal mold 70 comprises a top mold 72 and a bottom mold 74, and a cavity 75 is formed by the top mold 72 and the bottom mold 74. The profile of the bottom of the cavity 75 is a raised shape, and the size of this raised part corresponds to that of the solid polymer electrolyte membrane 22. Furthermore, the mold 70 is provided with a material supply path 76 for supplying the material of the frame-shaped member 28 to the cavity 75.

Figure 4B:
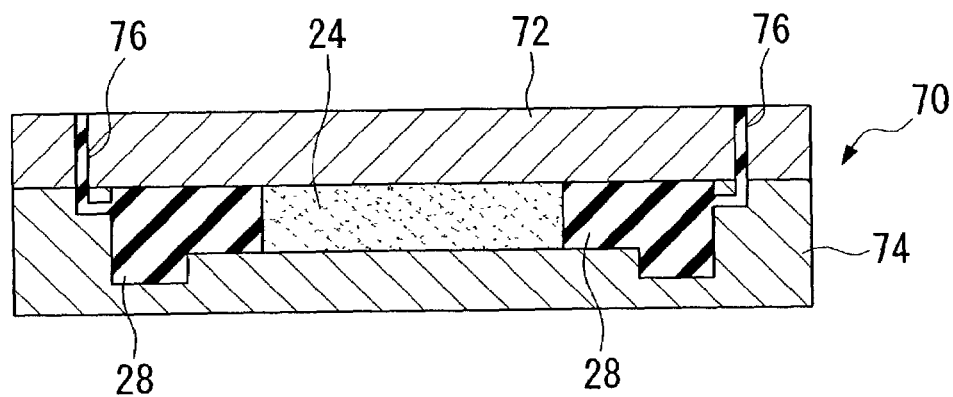
Figure 5A:
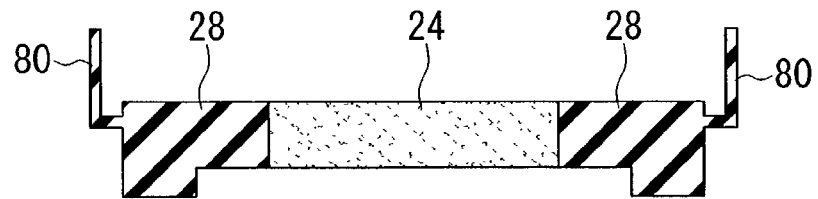
[FIG. 5A and FIG. 5B]
Figure 5B:
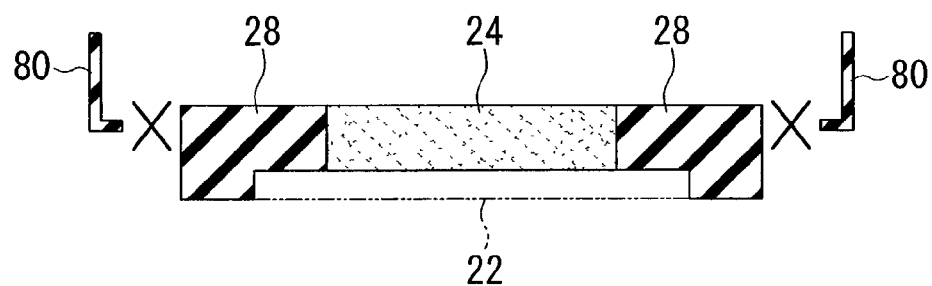

FIG. 4B, FIG. 5A, and FIG. 5B are diagrams of a manufacturing process of a frame-shaped member 28. As shown in FIG. 4B, an anode electrode 24 is placed in the center of the cavity 75, and fluoride resin, being the material of the frame-shaped member 28, is poured into a filler hole 76. Then, by cooling the inside of the cavity 75 in this condition, and holding for a fixed period of time, the resin in the cavity 75 is solidified, and the frame-shaped member 28 is molded around the anode electrode 24.

Figure 7:
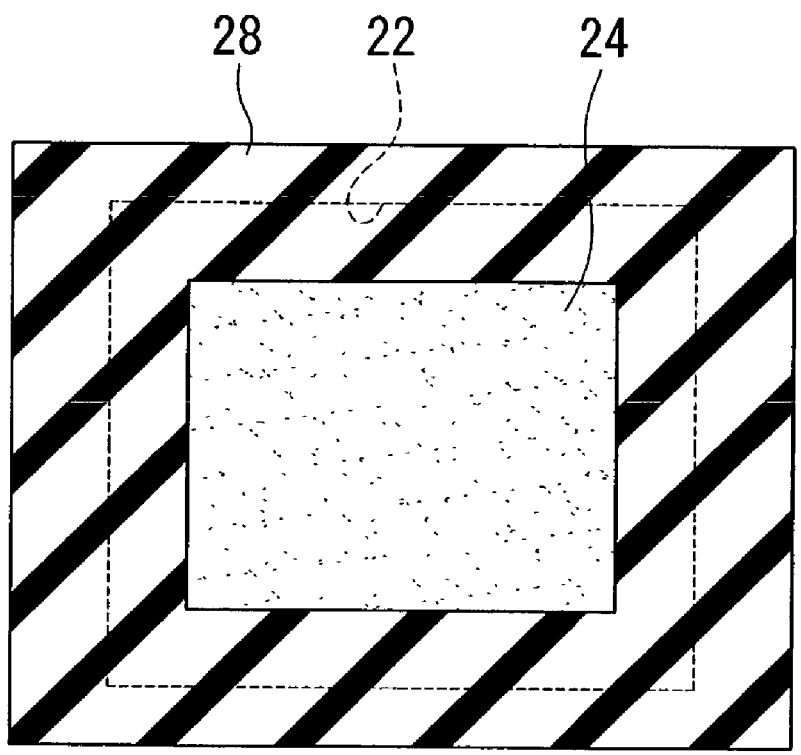
[FIG. 7]

Then, the anode electrode 24 with the frame-shaped member 28 molded thereto, is removed from the mold 70. At this time, as shown in FIG. 5A, since sprues 80 are attached to the frame-shaped member 28, the sprues 80 are cut off the frame-shaped member 28 as shown in FIG. 5B, and the manufacturing process of the frame-shaped member 28 is completed. In this manner, as shown in FIG. 7, it is possible to mold the frame-shaped member 28 onto the outer edges of the anode electrode 24 in one piece. By sandwiching the solid polymer electrolyte membrane 22 between the anode electrode 24 with the frame-shaped member 28 molded thereto in this manner, and the cathode electrode 26, a membrane electrode assembly 20 is formed.

Here, this manufacturing process differs depending on the material of the frame-shaped member 28. When the material of the frame-shaped member 28 is a resin or rubber, injection molding is desirable. However, when the material is carbon, it is preferable to use molding, and when the material is metal, to use casting.

Figure 6A:
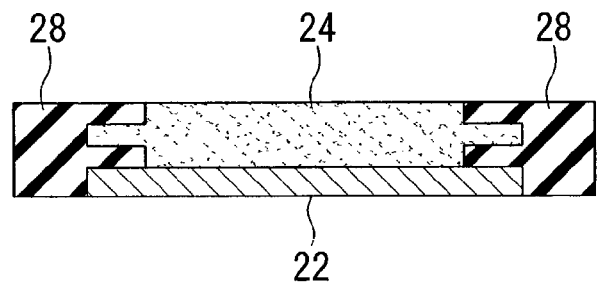
[FIG. 6A and FIG. 6B]
Figure 6B:
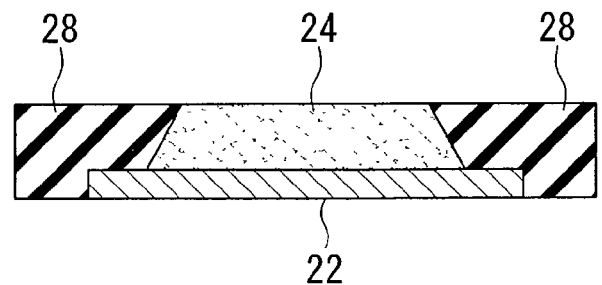

Furthermore, the shape of the anode electrode 24 on whose outer periphery the frame-shaped member 28 is provided, can be changed as required. FIG. 6A and FIG. 6B show an example of a modified anode electrode on which a frame-shaped first sealing member is provided. As shown in FIG. 6A, the central part of the edge face of the anode electrode 24 may be formed so as to protrude. By so doing, it is possible to increase the adhesive force of the frame-shaped member 28 and the anode electrode 24. Moreover, as shown in FIG. 6B, the anode electrode 24 may be formed in an approximately trapezoidal shape. By so doing, it is possible to reduce the required volume of the anode electrode 24 to achieve low cost, and also it is possible to increase the adhesive force.

Here, in the present embodiment, the frame-shaped member 28 is provided on the outer periphery of the anode electrode 24. However, the location where the frame-shaped first sealing member 28 is provided is not limited to this and it may be provided on the outer periphery of the cathode electrode 26.

According to the present invention as described above, since the first sealing member coats and supports the face and the edge face of the extending part of the solid polymer electrolyte membrane, it is possible to increase the strength of the solid polymer electrolyte membrane in the thickness direction, so that the durability is improved. Furthermore, since the frame-shaped first sealing member coats the extending part of the solid polymer electrolyte membrane, it is possible to increase the close contact with the solid polymer electrolyte membrane and the frame-shaped first sealing member.

According to the present invention, it is possible to increase the strength in the thickness direction and the strength in the edge face direction of the extending part of the solid polymer electrolyte membrane, so that the durability is improved further.

According to the present invention, by closely contacting the second sealing member and the frame-shaped first sealing member or the solid polymer electrolyte membrane, it is possible to seal the membrane electrode assembly against the outside using a single sealing structure, and hence it is possible to achieve proportionate compactness and low cost. Furthermore, since it is not necessary to support the solid polymer electrolyte membrane by sandwiching it with sealing members from both sides, the extending part of the solid polymer electrolyte membrane can be minimized, so that it is possible to achieve proportionately lower cost.

According to the present invention, since the durability of the solid polymer electrolyte membrane is further improved, then even in the case where the pressures of reactant gas supplied from the anode electrode side and from the cathode electrode side of the solid polymer electrolyte membrane are different, where conventionally there is a possibility of damage, it is possible to maintain an even more stable state.

According to the present invention, since it is possible to make the membrane electrode assembly sealed by the frame-shaped first sealing member and the second sealing member a double sealed structure by further sealing it by a third sealing member, it is possible to further increase the seal against the outside. Furthermore, since the first sealing member is formed in a frame shape, the degree of freedom of positioning of the second sealing member is increased, and hence it is possible to reduce the time required for positional adjustment. Moreover, since the second sealing member and the third sealing member are formed in different positions, the degree of freedom of selection of material and positional adjustment is increased, and hence it is possible to simplify fuel cell unit production.

What is claimed is:

1. A membrane electrode assembly provided with an anode electrode on one side of a solid polymer electrolyte membrane, and provided with a cathode electrode on the other side of the solid polymer electrolyte membrane, wherein a frame-shaped first sealing member having outer most peripheral edges that extend beyond outer peripheral portions of the solid polymer electrolyte membrane is provided in close contact with an outer peripheral edge face of one of said anode electrode or said cathode electrode, and only one face of the outer peripheral portion of said solid polymer electrolyte membrane extending beyond the electrodes is coated and supported by said frame-shaped first sealing member, the first sealing member not overlapping the electrodes, wherein said assembly is free of a frame-shape second seal member provided in close contact with an outer peripheral edge face of the other of said anode electrode or said cathode electrode.

2. A membrane electrode assembly according to claim 1, wherein said frame-shaped first sealing member coats an edge face of said solid polymer electrolyte membrane.

3. A fuel cell unit with a membrane electrode assembly provided with an anode electrode on one side of a solid polymer electrolyte membrane, and provided with a cathode electrode on the other side of the solid polymer electrolyte membrane, sandwiched between a pair of separators, wherein a frame-shaped first sealing member having outer most peripheral edges that extend beyond outer peripheral portions of the solid polymer electrolyte membrane, is provided in close contact with an outer peripheral edge face of only one of either of said anode electrode or cathode electrode, and one face of the extending part of said solid polymer electrolyte membrane is coated and supported by said frame-shaped first sealing member, and a second sealing member is provided only between said frame-shaped first sealing member and a separator contacting the other of said anode electrode or said cathode electrode.

4. A fuel cell unit according to claim 3, wherein said frame-shaped first sealing member coats an edge face of said solid polymer electrolyte membrane.

5. A fuel cell unit according to claim 3, wherein a third sealing member is provided outside of said frame-shaped first sealing member and second sealing member and between said pair of separators.

6. A fuel cell unit according to claim 4, wherein a third sealing member is provided outside of said frame-shaped first sealing member and second sealing member and between said pair of separators.

* * * * *